No. 869,989. PATENTED NOV. 5, 1907.
C. M. SPENCER.
THREADING MECHANISM FOR SCREW MACHINES.
APPLICATION FILED MAR. 8, 1906.
2 SHEETS—SHEET 1.
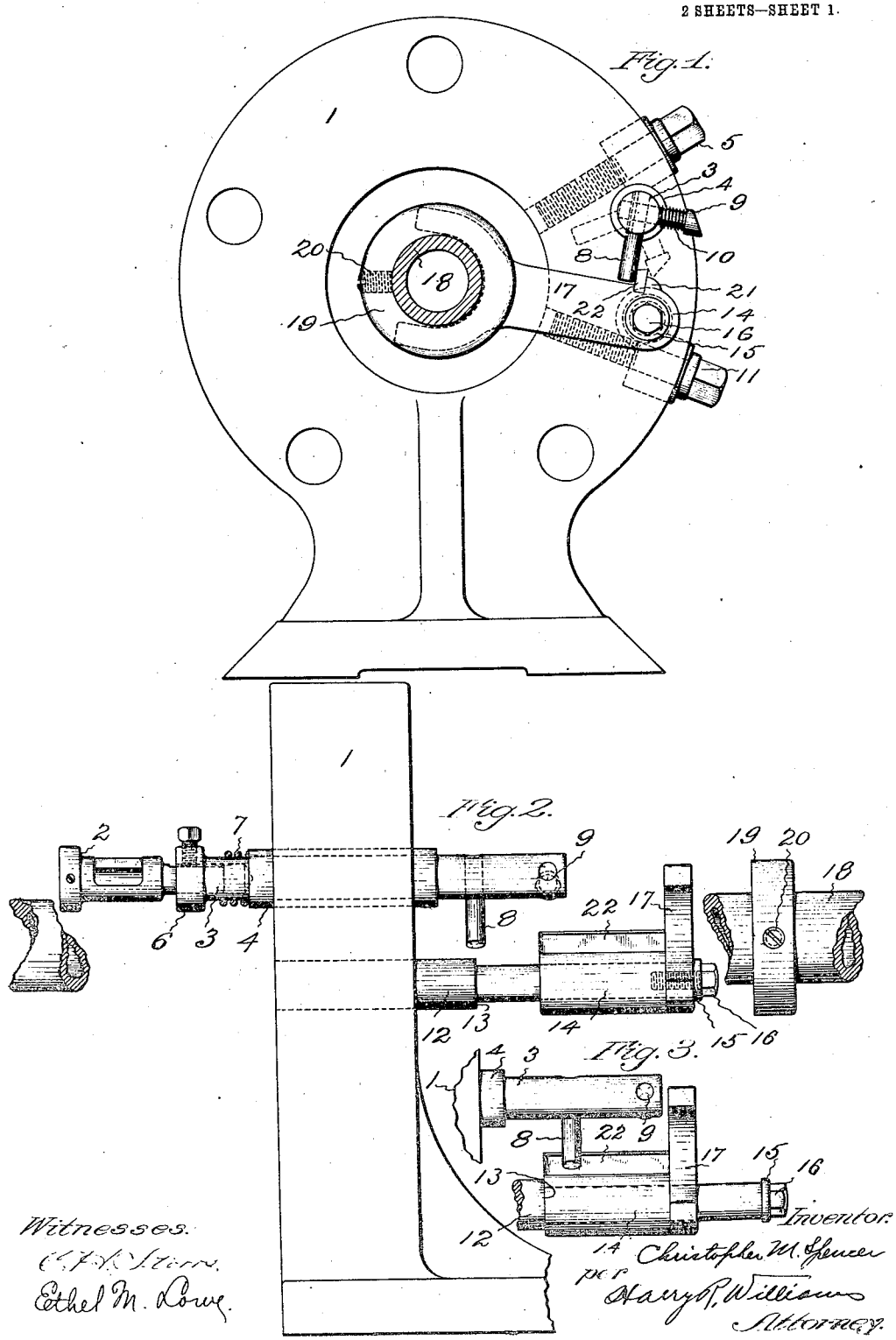

No. 869,989. PATENTED NOV. 5, 1907.
C. M. SPENCER.
THREADING MECHANISM FOR SCREW MACHINES.
APPLICATION FILED MAR. 8, 1906.
2 SHEETS—SHEET 2.
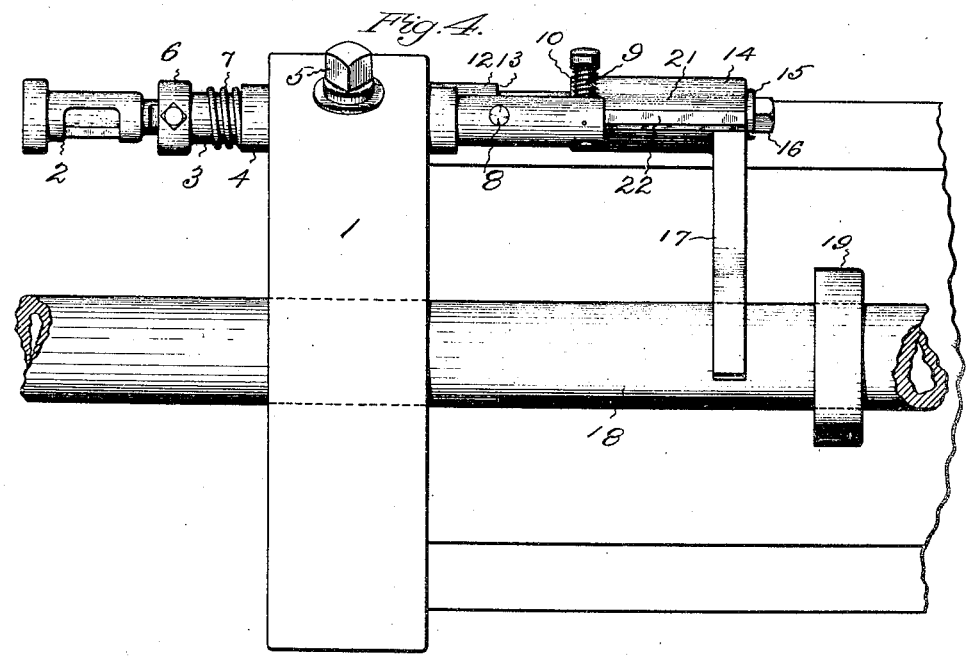
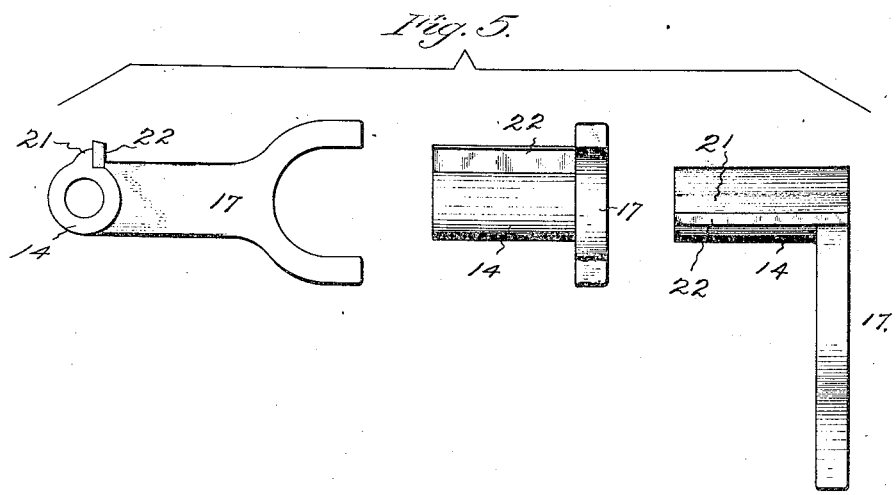

UNITED STATES PATENT OFFICE.

CHRISTOPHER M. SPENCER, OF WINDSOR, CONNECTICUT, ASSIGNOR TO THE UNIVERSAL MACHINE SCREW COMPANY, OF HARTFORD, CONNECTICUT, A CORPORATION OF CONNECTICUT.

THREADING MECHANISM FOR SCREW-MACHINES.

No. 869,989.      Specification of Letters Patent.      Patented Nov. 5, 1907.

Application filed March 8, 1906. Serial No. 304,840.

*To all whom it may concern:*

Be it known that I, CHRISTOPHER M. SPENCER, a citizen of the United States, residing at Windsor, in the county of Hartford and State of Connecticut, have invented a new and useful Threading Mechanism for Screw-Machines, of which the following is a specification.

This invention relates to the threading mechanism of a high speed automatic multiple spindle screw machine. In such machines it is necessary that the threading mechanism commence and finish operating at the correct times and that the mechanism be very sensitive in order that the threads be cut accurate and true and all danger of jamming the threads or injuring or dulling the cutting tap or die be eliminated.

The object of this invention is to provide a threading mechanism for a multiple spindle screw machine which is sensitive, which can be easily and quickly adjusted and which has its clutch parts so arranged and located that they engage and disengage with but little wear, thus prolonging the life of the mechanism and insuring accurate work.

To this end the invention resides in a mechanism having the means for holding and releasing the tap or die spindle back of the cutting tool head, where it can be readily adjusted, and where it releases independently of the movement of the head and all the other cutting tools carried by the head by reason of the tap or die spindle pulling forwardly completely away from the holding means.

The accompanying drawings show the mechanism designed for such an automatic multiple spindle screw machine as is set forth in my allowed application for patent filed May 4, 1904, Serial No. 206,277.

Figure 1 of the views shows the back face of a tool carrying head of such an automatic multiple spindle screw machine provided with a mechanism which embodies this invention. Fig. 2 shows a side elevation of the same. Fig. 3 shows a part of the mechanism in a different position from that shown in Fig. 2. Fig. 4 shows a plan of the head and mechanism. And Fig. 5 shows details of the holding sleeve and the forked arm by means of which it is moved and guided.

The tool head 1 is designed to be moved toward and from the head which carries the spindles that hold the stock. The spindles in the machine referred to are revolved from place to place and all are rotated in one direction so that the cutting tools carried by the tool head will act upon the stock, except as each spindle reaches a position opposite the threading tool it is rotated reversely for the purpose of cutting the thread upon the stock.

The threading tool shown is a common form of die 2. The shank of this die is clamped in a recess in the end of a spindle 3 which is loosely held in a bushing 4 that is clamped in an opening in the head by the clamp screw 5. Between the front end of the bushing and the collar 6 which is fastened on the front end of the spindle is a spring 7.

Projecting outwardly from the spindle back of the head is a fixed pin 8. This pin is fastened in a hole through the spindle. Near the back end of the spindle is a movable pin 9. The shank of this pin is loosely held in an opening in the spindle and its head which is beveled on the end is thrust outwardly by a spring 10.

Clamped by a set screw 11 in an opening through the head below the spindle is a post 12. A portion of this part is reduced so as to form a shoulder 13. Loosely supported on the reduced portion of the post is a slide, which is shown in the form of a sleeve 14. The sleeve is kept from sliding off the end of the post by a washer 15 and a bolt 16. Projecting from the sleeve toward the axis of the head is an arm 17, the inner end of which is forked so that it will straddle the driving shaft 18 which extends through the center of the head. On this shaft is a collar 19 which is held in position by a set screw 20.

Extending upwardly from the sleeve is a longitudinal rib 21 to which is fastened a hardened plate 22. This plate extends upwardly so that when the sleeve is in certain positions the fixed pin on the spindle will engage with one side of the plate and prevent the spindle from being rotated. The spring pin will when the spindle is rotated in one direction yield and pass the plate but when the spindle attempts to rotate in the other direction will engage with the other face of the plate and prevent the spindle from being rotated.

As the tool head moves away from the spindle head the fork on the arm that extends from the sleeve engages the collar on the driving shaft and is held while the head is moved back. This causes the post to slide through the sleeve until the front end of the sleeve engages the shoulder on the post, the collar on the shaft and the shoulder on the post being adjusted relatively to each other and to the amount of backward movement of the tool head to accomplish this.

As the tool head is fed toward the spindle head and the die engages the end of the stock, the die and die spindle are pushed back. Then when the stock is rotated reversely for cutting the thread the fixed pin on the die spindle engages the hardened plate on the sleeve and prevents the die spindle from being rotated. This causes the die as the head moves and carries it forward to commence cutting a thread on the end of the stock. The spring between the collar on the spindle and the end of the spindle bushing assists in starting the die onto the end of the stock, although this spring is not absolutely necessary. After the thread has been started the die follows the lead of the thread and continues the cut. The cutting of the thread continues as long as the pin fixed to the die spindle engages the plate and holds the spindle from rotation. When the lead of the thread draws the spindle forward sufficiently far for the pin to be drawn beyond the front edge of the plate on the sleeve the sleeve is pushed back out of the way by the pin and then the spindle rotates with the stock and the cutting of the thread ceases. The front edge of the plate is preferably slightly beveled or rounded so that when the pin reaches the end it will push the sleeve back out of the way of the pin.

When the direction of rotation of the stock changes from reversely to forwardly, which occurs about the same time that the tool head commences to move backwardly the spring pin engages the edge of the plate on the sleeve and holds the die spindle against rotation. This causes the stock to unscrew from the die. When the die spindle is rotating reversely, just after the cutting of the thread has been finished, the spring pin yields as it passes the plate on the sleeve so that the die spindle may rotate freely but when the stock is rotated oppositely, that is, forwardly, for the purpose of unscrewing the stock from the die the spring pin catches the plate and holds it until the stock is unthreaded.

The die is so balanced that when relieved of all pressure the fixed pin and spring pin hang downwardly one on each side of the plane of the plate on the sleeve. It is intended that the tool head move backwardly at practically the same rate that the thread which has been been cut forces back the die and die spindle.

The time that the die is operating to cut the thread depends upon the length of time that the fixed pin on the die spindle is in engagement with the plate on the sleeve and this time is governed by the distance back from the front end of the sleeve that the pin engages and by the relation of the rate of feed of the die, due to the lead of the thread being cut, and the rate of feed of the spindle head which carries the die spindle and the post and sleeve. Therefore, the length of the thread which is cut is determined by the location of the shoulder on the post against which the front end of the sleeve is pushed when the spindle head is moved backwardly. The collar is adjusted on the shaft in such a manner as to push the sleeve forwardly each time up to the shoulder. The spindle sleeve is adjusted back and forth in the head in order to commence the cut at the proper time with relation to the feeding of the head and the feeding of the other tools which the head carries, and the post is adjusted so that the collar will leave the sleeve at the proper place to cause the die to stop cutting when the desired thread is cut.

With this mechanism the cutting of the thread is accomplished practically independently of the cutting of the other tools. The threading spindle is very sensitive and it is easy to adjust the parts closely in order to release the die spindle and stop the cutting of the thread at the proper time.

The parts are all simple to make, easy to assemble, and they can be quickly adjusted. There is but little wear and there is no pounding or hammering of the clutch parts when the machine is running rapidly, such as occurs when the clutch parts are arranged in front of the tool head, for in this case the holding sleeve is pushed backwardly from the advancing head when the pin disengages.

The invention claimed is:—

1. The combination with the movable tool head of a screw machine, of a spindle loosely supported by said head, a threading tool clamped to the spindle, pins projecting from said spindle, a slide loosely supported by the head, and means for holding the slide when the head is moved backwardly so that the pins will be carried into the plane of the slide, substantially as specified.

2. The combination with the movable tool head of a screw machine, of a spindle loosely supported by the head, a threading tool clamped to the spindle, pins projecting from the spindle back of the head, a slide back of and loosely supported by the head, and means for holding the slide when the head is moved backwardly so that the pins will be carried into the plane of the slide, substantially as specified.

3. The combination with the movable tool head of a screw machine, of a spindle loosely supported by the head, a threading tool clamped to the spindle, a spring arranged to thrust the spindle forwardly, pins projecting from said spindle, a slide loosely supported by the head, and means for holding the slide when the head is moved backwardly so that the pins will be carried into the plane of the slide, substantially as specified.

4. The combination with the movable tool head of a screw machine, of a bushing clamped in an opening in the head, a spindle movable in the bushing, a threading tool clamped to the spindle, pins projecting from the spindle back of the head, a slide loosely supported by the head, and means for holding the slide when the head is moving backwardly so that the pins will be carried into the plane of the slide, substantially as specified.

5. The combination with the movable tool head of a screw machine, of a spindle loosely supported by the head, a threading tool clamped to the spindle, pins projecting from the spindle back of the head, a post carried by the head, a sleeve movable on the post, and means for holding the sleeve when the head is moving backwardly so that the pins will be carried into the plane of the sleeve, substantially as specified.

6. The combination with the movable tool head of a screw machine of a spindel loosely supported by the head, a threading tool clamped to the spindle, pins projecting from the spindle back of the head, a shouldered post adjustably clamped to and extending backwardly from the head, a sleeve movable on the post, and means for holding the sleeve when the head is moving backwardly so that the pins will be carried into the plane of the sleeve, substantially as specified.

7. The combination with the movable tool head of a screw machine, of a spindle loosely supported by the head, a threading tool clamped to the spindle, pins projecting from the spindle back of the head, a shouldered post adjustably clamped in an opening in and extending backwardly from the head, a sleeve movable on the post, an arm extending from the sleeve, and a collar adjustably fixed upon the shaft and adapted to engage the arm and hold the sleeve when the head is moving backwardly, substantially as specified.

8. The combination with the movable tool head of the screw machine, of a spindle loosely supported by the head, a threading tool clamped to the spindle, a fixed pin projecting from the spindle, a spring pin projecting from the spindle, a shouldered post held in an opening in the head, a sleeve movable on the post and having an inwardly extending forked arm, and an adjustable collar adapted to engage the forked arm when the head is moved backwardly, substantially as specified.

9. A threading mechanism for a screw machine having a head, a spindle loosely supported by said head, a pin fixed to the spindle, and a pin movably connected with the spindle back of the head, a post supported by the head, a sleeve movable longitudinally on the post back of the head, means for holding the sleeve against turning on the post, and a wall on the sleeve adapted to be engaged by the pins, substantially as specified.

CHRISTOPHER M. SPENCER.

Witnesses:
ETHEL M. LOWE,
HARRY R. WILLIAMS.